US010654445B2

(12) United States Patent
Mirza

(10) Patent No.: US 10,654,445 B2
(45) Date of Patent: May 19, 2020

(54) VEHICULAR SYSTEM AND METHOD FOR SENDING SILENT REQUEST FOR ASSISTANCE WHEN DRIVING UNDER DURESS

(71) Applicant: Continental Automotive GmbH, Hannover (DE)

(72) Inventor: Zainab Mirza, Singapore (SG)

(73) Assignee: Continental Automotive GmbH, Hannover (DE)

(*) Notice: Subject to any disclaimer, the term of this patent is extended or adjusted under 35 U.S.C. 154(b) by 0 days.

(21) Appl. No.: 16/196,359

(22) Filed: Nov. 20, 2018

(65) Prior Publication Data
US 2019/0152432 A1 May 23, 2019

(30) Foreign Application Priority Data
Nov. 22, 2017 (GB) .................................. 1719352.5

(51) Int. Cl.
*B60R 25/10* (2013.01)
*G06K 9/00* (2006.01)
(Continued)

(52) U.S. Cl.
CPC ........ *B60R 25/1004* (2013.01); *B60R 25/252* (2013.01); *B60R 25/30* (2013.01);
(Continued)

(58) Field of Classification Search
CPC .................. B60R 25/1004; G06K 9/00288
(Continued)

(56) References Cited

U.S. PATENT DOCUMENTS 8,344,849 B2* 1/2013 Larsson .................. B60R 25/25
340/426.11
8,952,781 B2* 2/2015 Al-Azem ............ H04L 63/0861
340/5.52
(Continued)

FOREIGN PATENT DOCUMENTS

CN 202541481 U 11/2012
EP 0761514 A1 3/1997
(Continued)

OTHER PUBLICATIONS

Great Britain Search Report for Application No. GB1719352.5, dated May 16, 2018—6 pages.

*Primary Examiner* — Tai T Nguyen
(74) *Attorney, Agent, or Firm* — RatnerPrestia

(57) ABSTRACT

A vehicular system and method for sending a silent request for assistance when driving under duress is disclosed. The vehicular system includes of a data communication module, an identification detector and a decision unit. The decision unit determines a condition during ignition of an engine based on one or more biometric data inputs received through the identification detector. In particular, if the condition during ignition is determined as under normal circumstances, the decision unit commands or execute ignition of engine and user's preferred settings, if any. If the condition during ignition is determined as under duress, the decision unit commands or execute ignition of engine and user's preferred settings, and the data communication module to send a notification to an external party simultaneously.

24 Claims, 6 Drawing Sheets

(51) Int. Cl.
    *B60R 25/30*     (2013.01)
    *B60R 25/25*     (2013.01)
    *G06K 9/68*     (2006.01)

(52) U.S. Cl.
    CPC ..... *G06K 9/00087* (2013.01); *G06K 9/00288* (2013.01); *G06K 9/00302* (2013.01); *G06K 9/00845* (2013.01); *G06K 9/685* (2013.01); *B60R 2025/1016* (2013.01)

(58) Field of Classification Search
    USPC .................. 340/426.1, 425.5, 5.52, 5.8, 5.83
    See application file for complete search history.

(56) References Cited

U.S. PATENT DOCUMENTS

| | | | |
|---|---|---|---|
| 9,242,619 B2* | 1/2016 | Choi | B60R 25/25 |
| 9,802,481 B2* | 10/2017 | Griffin | B60K 28/063 |
| 2002/0038818 A1 | 4/2002 | Zingher et al. | |
| 2007/0126560 A1* | 6/2007 | Seymour | B60R 25/241 |
| | | | 340/426.1 |
| 2007/0198850 A1 | 8/2007 | Martin et al. | |
| 2009/0293589 A1* | 12/2009 | Freund | G07C 5/0891 |
| | | | 73/23.3 |
| 2012/0050010 A1 | 3/2012 | Largue | |
| 2014/0285216 A1 | 9/2014 | Cuddihy et al. | |
| 2017/0057353 A1* | 3/2017 | Griffin | B60K 28/063 |
| 2019/0066424 A1* | 2/2019 | Hassani | B60R 25/23 |

FOREIGN PATENT DOCUMENTS

| | | |
|---|---|---|
| EP | 1496478 A2 | 1/2005 |
| RU | 2325290 C1 | 5/2008 |

* cited by examiner

```
                                                        ┌─200b
```

> Determines biometric data input received at 202 and biometric data input with first set of pre-registered biometrics data at 208 is a mismatch 214

> Compares biometric data input with second set of pre-registered biometrics data 216

> Determines condition during ignition as under duress if biometric data input matches with second set of pre-registered biometric data 218

> Receives biometric data input through an identification detector 220

> Compares biometric data input with third set of pre-registered biometrics data to determine if there is a mismatch 222

> Execute ignition of engine and execute user's preferred settings 224

> Simultaneously commands data communication module to send request for assistance and location of vehicle 226

Fig. 2b

VEHICULAR SYSTEM AND METHOD FOR SENDING SILENT REQUEST FOR ASSISTANCE WHEN DRIVING UNDER DURESS

CROSS REFERENCE TO RELATED APPLICATIONS

This application, which claims priority to Great Britain Patent Application No. 1719352.5, filed Nov. 22, 2017, the contents of such applications being incorporated by reference herein.

FIELD OF THE INVENTION

This disclosure relates to a safety and security system and method for starting an engine, in particular, whether the starting of engine is made under normal circumstances or under duress. In particular, if starting of the engine was made under duress, the engine ignites and sends a silent request or notice to an external party for assistance simultaneously, to ensure the safety of the driver, while at the same time, wait for a rescue team to arrive. Such a safety and security system may be suitable for automotive or aviation industry.

BACKGROUND OF THE INVENTION

Biometric safety and security system is an existing art which uses biometric technology to authenticate a user's identity and allow access to a building, premises or even a vehicle.

By way of example, EP 1496478 A2, incorporated herein by reference, discloses a fingerprint safety and security system that uses fingerprint recognition to grant access to the system. EP 1496478 A2 uses different fingerprint registration for the safety and security system to recognize whether attempt to access the system was made under duress. However, EP 1496478 A2 does not disclose a solution as to how a user activating the system under duress may escape from the situation safely.

In another example, US 2007/0198850 A1, incorporated herein by reference, discloses a biometric verification and duress detection system and method that utilizes biometric technology as unique identifier to activate and deactivate the safety and security system. US 2007/0198850 A1 includes a duress indicator data base for verifying a user attempting to access, including scenario of forced entry under duress. US 2007/0198850 A1 includes the function of sending an alert signal to a central monitoring station which will take appropriate actions for prevention of forced entry, such as deactivating the safety and security system to prevent forced entry. However, exit from the area secured by the safety and security system will not be possible and the user will not be able to escape from the situation safely.

The above attempted solutions provide how biometric technology may be implemented to prevent forced entry or unauthorized entry to premises by third party through activating the safety and security system by a user under duress, but does not ensure a user's safety while waiting for assistance or rescue team to arrive. There is therefore a need to provide a solution to ensure the user's safety.

SUMMARY OF THE INVENTION

An aspect of the invention is a safety and security system and method that utilizes biometric technology that identifies whether starting of engine was made under normal circumstances or under duress and activating and sending a silent request or notice to an external party for assistance simultaneously, to ensure the safety of the driver, while at the same time, wait for a rescue team to arrive.

In a first aspect, there is provided a vehicular system. The vehicular system may comprise of a data communication module; an identification detector to receive one or more biometric data inputs; and a decision unit to determine a condition during ignition of an engine based on the one or more biometric data inputs, in which the condition during ignition is determined as (a) under normal circumstances or (b) under duress. Preferably, the decision unit commands the data communication module to send a notification to an external party when the condition during ignition is determined as under duress. The aforesaid setup provides a vehicular system that is capable of recognizing whether starting of an engine is being made under normal circumstances or under duress.

Preferably, the condition during ignition is determined as under normal circumstances when the one or more biometric data inputs received is a match with a first set of pre-registered biometrics data. By way of example, the one or more biometric data inputs received by the identification detector is compared against the first set of pre-registered biometrics data.

Preferably, the condition during ignition is determined as under duress when the one or more biometric data inputs received is a match with a second set of pre-registered biometrics data. On a similar note as described above, the one or more biometric data input received by the identification detector is compared against the second set of pre-registered biometrics data. The first set of pre-registered biometrics data may be different from the second set of pre-registered biometrics data.

Advantageously, the above setup allows the decision unit of the vehicular safety and security system to determine whether starting of engine was made under normal circumstances or under duress.

Preferably, the one or more biometric data input is a fingerprint or a facial recognition image. Other suitable types of biometric data such as voice recognition may also apply.

The first set of pre-registered biometrics data may be a fingerprint. The second set of pre-registered biometrics data may be a fingerprint that is different from the first set of pre-registered biometrics data. In an example, the first set of pre-registered biometrics data may be a left-hand fingerprint and the second set of pre-registered biometrics data may be a right-hand fingerprint. The first set of pre-registered biometrics data may be used as an input to activate ignition of the engine under normal circumstances and the second set of pre-registered biometrics data may be used as an input to activate ignition of the engine under duress or vice versa. Alternatively, the first set of pre-registered biometrics data may be a fingerprint and the second set of pre-registered biometrics data may be a facial recognition image under duress.

A third set of pre-registered biometrics data may be used. The third set of pre-registered biometrics data may be a facial recognition image or voice recognition data under normal circumstances. Advantageously, the third set of pre-registered biometrics data may be used as a safeguard or measure against erroneous activation of the vehicular safety and security system under duress. Further to the above example, assuming in the event that the second set of pre-registered biometrics data is detected as the input to activate ignition of the engine, the decision unit determines the condition of ignition as under duress. The decision unit may use the third set of pre-registered biometrics data as a measure to verify whether there is a mismatch between the pre-registered facial recognition image under normal circumstances and a biometric data input captured. If there is a mismatch between the third set of pre-registered biometrics data under normal circumstances and the biometric data input, for example an image of the subject starting the engine shows that the subject is under duress, then the decision unit may verify or confirm that the condition of ignition is under duress. Conversely, the third set of pre-registered biometrics data may be a facial recognition image or voice recognition data under duress, e.g. facial image or voice data expressing anxiety or fear, and the decision unit may recognize a match between the third set of pre-registered biometrics data under duress and a biometric data input captured to confirm that the condition of ignition is under duress. Facial recognition may be undertaken by any suitable methods, including mapping facial features or points to distinguish facial expression.

When the condition during ignition is determined as under normal circumstances, ignition of the engine occurs. Depending on design specification of the vehicular system, the system may be used in conjunction with other interior modules and the decision unit may execute, or route the message to a central gateway to command other central unit to execute the user's preferred vehicular settings.

When the condition during ignition is determined as under duress, ignition of the engine and the decision unit commanding the data communication module to send the notification to the external party occur simultaneously. Beneficially, the objective of activating a safety and security system and sending a silent notification to an external party simultaneously, to ensure a user's safety is achieved. When the condition during ignition is determined as under duress, an identification detector or a camera may be activated to capture a video or image of the area under threat.

Preferably, the notification may comprise of a request for assistance, and a location of the vehicular security system. The notification may further comprise an image captured by an identification detector.

The aforesaid safety and security system may be applicable to any types of motor vehicles. Therefore in a second aspect, a motor vehicle having a vehicular system as disclosed herein is provided.

In a third aspect, a method of sending a request for assistance from a vehicular system is provided. The method comprises the steps of determining a condition during ignition of an engine based on one or more biometric data inputs received from an identification detector, in which the condition during ignition is determined as (a) under normal circumstances or (b) under duress; and commanding a data communication module to send the request for assistance to an external party when the condition during ignition is determined as under duress.

Preferably, if the condition during ignition is determined to be under normal circumstances, the ignition of the engine occurs.

Preferably, if the condition during ignition is determined to be under duress, the ignition of the engine and the sending of request for assistance to the external party occur simultaneously.

The condition during ignition may be determined by comparing each biometric data input against a set of pre-registered biometrics data stored in the vehicular system.

The condition during ignition may be determined as under normal circumstances when the one or more biometric data inputs received compared against a first set of pre-registered biometrics data is a match.

The condition during ignition may be determined as under duress when the one or more biometric data inputs received compared against a third set of pre-registered biometrics data is a mismatch.

As mentioned above, the one or more biometric data inputs may be a fingerprint or a facial recognition image or other suitable types of biometric data such as voice recognition. Ideally, the first set of pre-registered biometrics data may be a fingerprint, for example a left-hand fingerprint and the second set of pre-registered biometrics data may be a fingerprint that is different from the first set of pre-registered biometrics data, for example a right-hand fingerprint or vice versa. More preferably, the third set of pre-registered biometrics data may be a facial recognition image under normal circumstances.

The aforesaid comparison of biometric data inputs received against a plurality of sets of pre-registered biometrics data works on the principles that if a pre-registered biometric data matches with a registration process for activating the system or starting an engine based upon a first set of pre-registered biometrics data, ignition of engine occurs and in the event that the biometric data is registered under a second set of pre-registered biometrics data as an activator under duress, a secondary comparison against a third set of pre-registered biometric data is used for comparison, to ensure that activation or ignition of engine under duress is not an error, thus a request for assistance may be sent out for help.

Preferably, the request for assistance further includes a location of the vehicular security system, thereby ensuring the safety of the user by activating the vehicular system as if under normal circumstances and sending a request for assistance simultaneously.

BRIEF DESCRIPTION OF THE DRAWINGS

Other aspects will become apparent from the following description of embodiments with reference to the accompany drawings in which:

FIG. 2A and FIG. 2B shows flowcharts illustrating the decision process by the decision unit according to a preferred embodiment.

DETAILED DESCRIPTION OF THE PREFERRED EMBODIMENTS

Hereinafter, an explanation of the safety and security system and method thereof will be discussed in details. The terms "a first", "a second" and "a third" the like used herein may refer to modifying various different elements of various embodiments of the present disclosure, but do not limit the elements. The expressions may be used to distinguish one element from another element. For instance, "a first set of pre-registered biometrics data", "a second set of pre-registered biometrics data" and "a second set of pre-registered biometrics data" may indicate different sets of biometrics data used in a registration process, of which each biometrics data refers to a different fingerprint registration or a different facial recognition image, with no particular order of preference or importance, without departing from the scope of the present disclosure.

The term "decision unit" may be construed to refer to an algorithm, a processor or a computing medium that benchmarks data inputs against a set of data templates stored in a memory or a cloud system. The term "memory" should be interpreted broadly to encompass any electronic component capable of storing electronic information. The term memory may refer to various types of processor-readable media for example, random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

It shall be understood by a person skilled in the art, the safety and security system as disclosed herein may be implemented with different applications, for instance an automotive or aviation.

In a vehicular system scenario, it is possible for the safety and security system to be in communication with other vehicular modules, by way of suitable network buses such as CAN, LIN or Flex ray.

Figure 1:
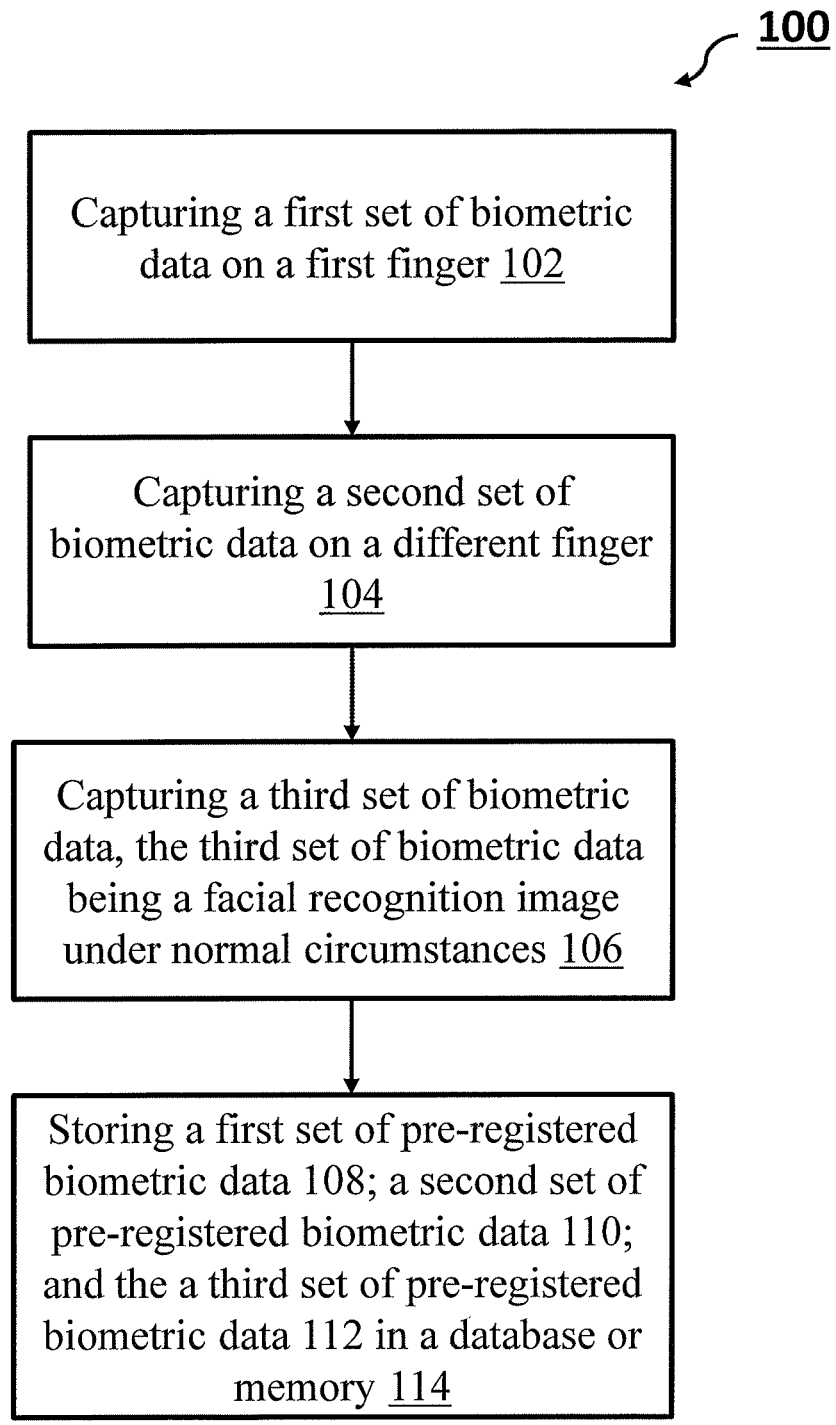
FIG. 1 shows flowchart for a biometric registration process according to a preferred embodiment.

With reference to FIG. 1, which shows a biometric registration process flowchart 100 for creating a plurality of sets of biometrics data for determining whether the safety and security system is activated under normal circumstances or under duress.

In a preferred embodiment, registration process for biometric data uses fingerprint registration as a set of biometric data template, to determine whether safety and security system was activated under normal circumstances or under duress. The fingerprint registration process requires capturing of a biometric data input of a first finger at step 102 for activating safety and security system under normal circumstances or normal operation, and capturing of a biometric data input of a second finger at step 104 for activating safety and security system under duress. Both fingerprints are saved in a memory or database as a first set of pre-registered biometrics data 108 and a second set of pre-registered biometrics data 110, respectively, to benchmark or compare against biometric data inputs received during activation of safety and security system. The first finger may be a left-hand fingerprint and the second finger may be a right-hand fingerprint. The first set of pre-registered biometrics data 108 and the second set of pre-registered biometrics data 110 are stored in a database or memory at step 114 for future reference.

As a safeguard or measure against erroneously activating the safety and security system using the second finger meant for activating safety and security system under duress, in an alternative embodiment, an additional set of biometrics data is pre-registered for a secondary verification. This additional or a third set of pre-registered biometrics data 112 may be facial recognition images of a user. The facial recognition images capture facial images of the user under normal circumstances at step 106 and are saved in memory or database at step 114 for future use.

Figure 2A:
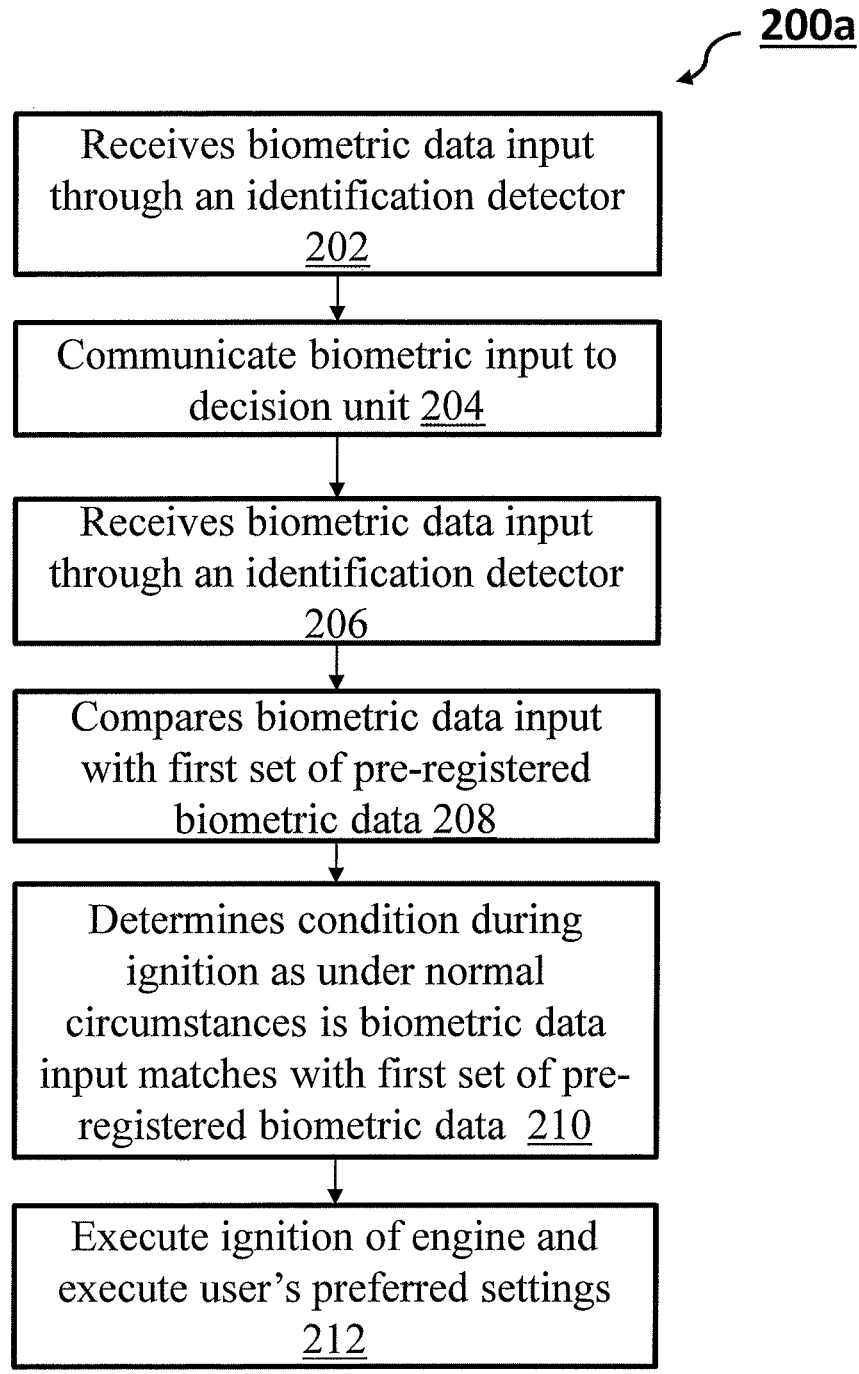

FIG. 2A shows a flowchart 200a illustrating the decision process by the decision unit in accordance with a preferred embodiment.

Figure 4:
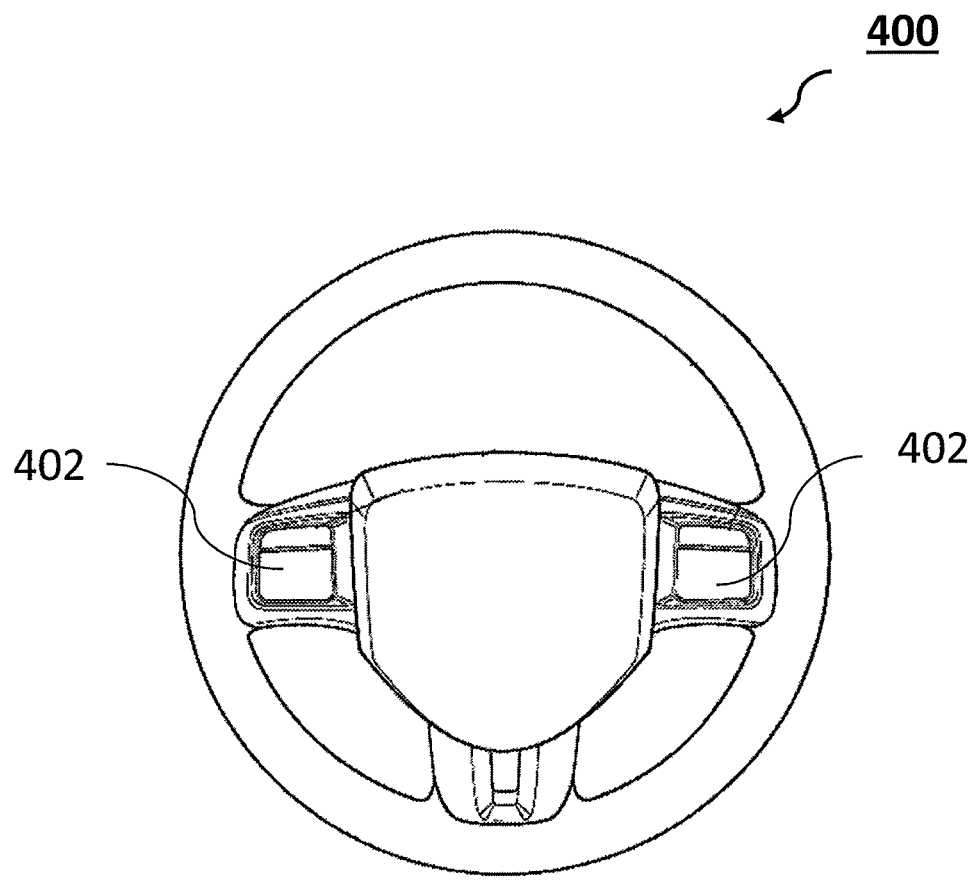
FIG. 4 shows an identification detector on a steering wheel according to a preferred embodiment.

In step 202, the system receives a biometric data input from an identification detector. An identification detector may be a fingerprint sensor. In a preferred embodiment as shown in FIG. 4, a pair of fingerprint sensors 402 is provided on a steering wheel, for receiving a first fingerprint on the left side and a second or different fingerprint on the right. The fingerprint sensor may also be linked to a database having stored therein pre-registered fingerprints of registered drivers (e.g. the first set of pre-registered fingerprints), so that comfort settings (such as temperature and direction of the cabin air stream and vents) or convenience settings (such as position and height of the driver's seat) of the identified driver can be retrieved. The identification detector may also be an interior camera within the passenger compartment, with facial recognition capabilities. Where the biometric data input is voice recognition data, the identification detector may be a microphone.

The identification detector or a camera may also include function of capturing one or more images of the subject or driver, including his surroundings, for example, the surrounding of the passenger compartment of a vehicle. The aforesaid security feature functions to avoid false alarm triggering. By including a facial recognition system to detect anxiety or fear of the driver or subject, the system is able to verify that the ignition of engine is under condition of duress, and not a false activation of ignition of engine under duress.

A decision unit in communication with the identification detector receives the biometric data inputs at step 204. The decision unit may further include an algorithm or a processor to execute the decision process by comparing biometric data input received at step 202 and making a comparison against a plurality of pre-registered biometric data at step 208. For brevity, the description hereinafter shall refer to the element for executing the decision collectively as "the decision unit".

The decision unit compares the biometric data input received against the first set of pre-registered biometric data to determine if it is a match, at step 208. If the decision unit determines that the biometric data input received at step 202 matches with the first set of pre-registered biometric data at step 208, the decision unit determines that the condition of ignition was made under normal circumstances at step 210. At step 212, the decision unit sends a command to ignite the engine and execute user's preferred settings, if available.

FIG. 2B shows a flowchart 200b illustrating the decision process by the decision unit in accordance with a preferred embodiment, when the decision unit at step 208, determines that the biometric data input received at step 202 is a mismatch with the first set of pre-registered biometrics data.

Once the decision unit determines at step 214, that the biometric data input received at 202 and biometric data input with first set of pre-registered biometrics data at 208 is a mismatch, the decision unit goes on to compare the biometric data input received with the second set of pre-registered biometrics data at step 216.

If the biometric data input matches with the second set of pre-registered biometric data at 218, the decision unit determines condition during ignition as under duress.

As a safeguard or measure against sending out a request for assistance erroneously, at step 220, the decision unit receives a biometric input through the identification detector. This biometric data input is a different form of biometric data input from fingerprint, for example, an image of the user in driver's seat. Other types of biometric activator such as voice may also be applicable. In this scenario, the identification detector may be an interior camera for monitoring drivers or interior of a passenger compartment, with facial recognition capabilities.

The facial image of the driver received is compared against a third set of pre-registered biometrics data at step 222. The third step of pre-registered biometric data being facial recognition images of the user, taken under normal circumstances.

In the event that the biometric data input with the third set of pre-registered biometrics data is a mismatch at 222, the decision unit verifies or confirms that the condition during ignition is under duress. Subsequently at 224, the decision unit gives command to execute ignition of engine and to execute user's preferred settings, if any, and simultaneously commands a data module to send a request for assistance and location of the vehicle at step 226.

Figure 3:
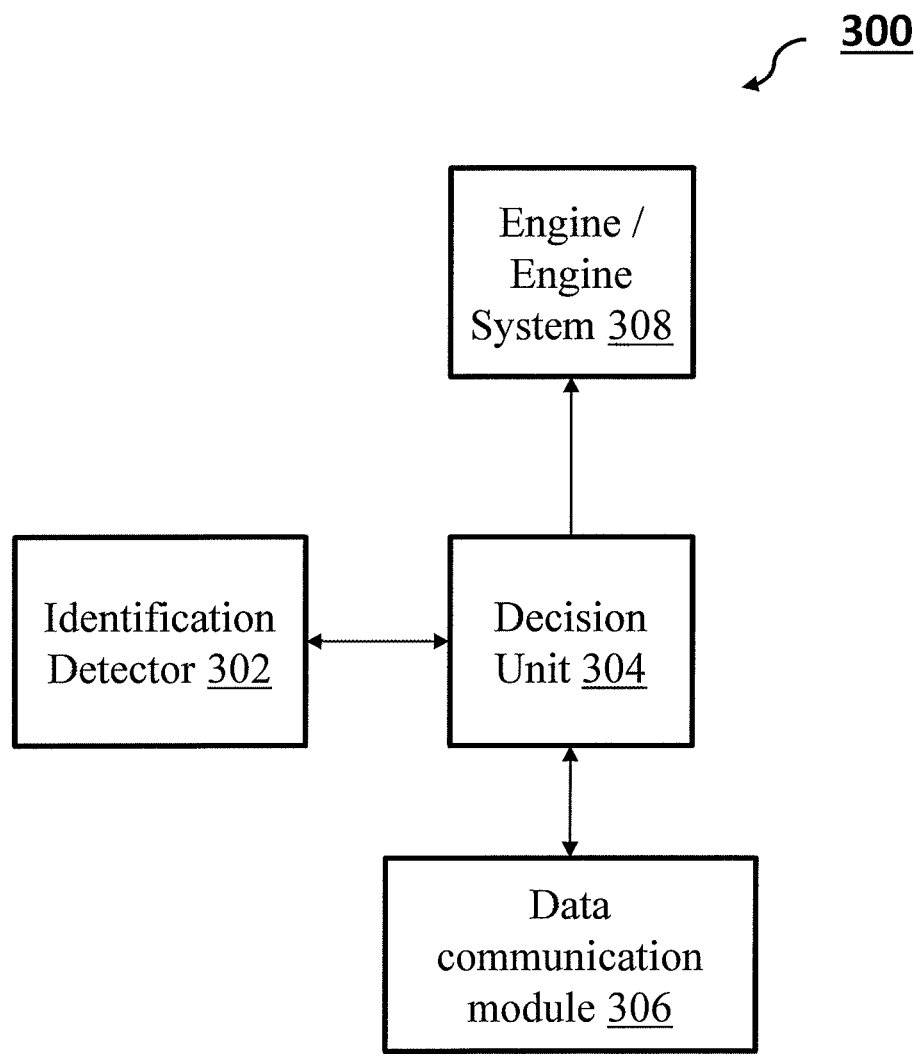
FIG. 3 shows a diagram of the elements that makes up a vehicular system 300 according to a preferred embodiment.

Turning now to FIG. 3 which shows a diagram of the relationship between the different elements or modules of the vehicular safety and security system 300 as disclosed herein, an identification detector 302 is in bi-directional communication with a decision unit 304. The identification detector 302 is one or more fingerprint sensors 402 as show in FIG. 4 in preferred embodiment. In another preferred embodiment, the identification detector 302 is a camera (not shown) for monitoring a driver or interior of a passenger compartment of a motor vehicle. The decision unit 304 receives biometric data inputs from the identification detector 302. In other embodiments, the decision unit 304 may command the identification detector 302 for an additional or secondary biometric data input(s), for verification or confirmation purposes.

The decision unit 304 is in bi-directional communication with a data communication unit 306 and in simplex communication with an engine or engine system 308. The data communication unit 306 provides a channel for sending notifications to an external party, such as an adjacent vehicle, or a police department, hospital or ambulance service through satellite communications. The notification is a request for assistance and a location of the vehicle. The notification is sent out from the vehicular safety and security system in the form of a wireless signal, such as radio signals. The notification may include an image of a subject and his surroundings, as captured by the identification detector 302.

Advantageously, in the event that the condition during ignition of the engine 308 in accordance with the decision process (FIG. 2A and FIG. 2B referred) as discussed above is determined to be under duress, the decision unit 304 commands the engine 308 to ignite and execute user's preferred settings if available, and sends a notification, including a request for assistance and a location of the vehicular system 300 through data communication module 306 simultaneously. This ensures the safety of the user by igniting the engine 308 and discretely sending a silent notice to external party requesting for assistance.

In a preferred embodiment, the data communication module 306 is an antenna for sending wireless signals external systems of the vehicle. In yet another preferred embodiment, the data communication module 306 is a smartphone terminal with capabilities to be linked to a mobile communication device such as a mobile phones and the like, allowing communication with parties external to the vehicular system. Types of suitable wireless signals includes radio signals applicable to WiFi, Bluetooth Low Energy (BLE), long-term evolution (LTE)/universal mobile telecommunications system (UMTS), $5^{th}$ generation wireless system (5G) platforms.

The location of the vehicle may be determined by a global positioning system (GPS). The request for assistance and location of the vehicle is sent as a wireless signal to an external party. In a preferred embodiment, the external party is an adjacent vehicle. In another preferred embodiment, the request for assistance and location of the vehicle is sent to an external party, for example police department, through satellite communications.

Figure 5:
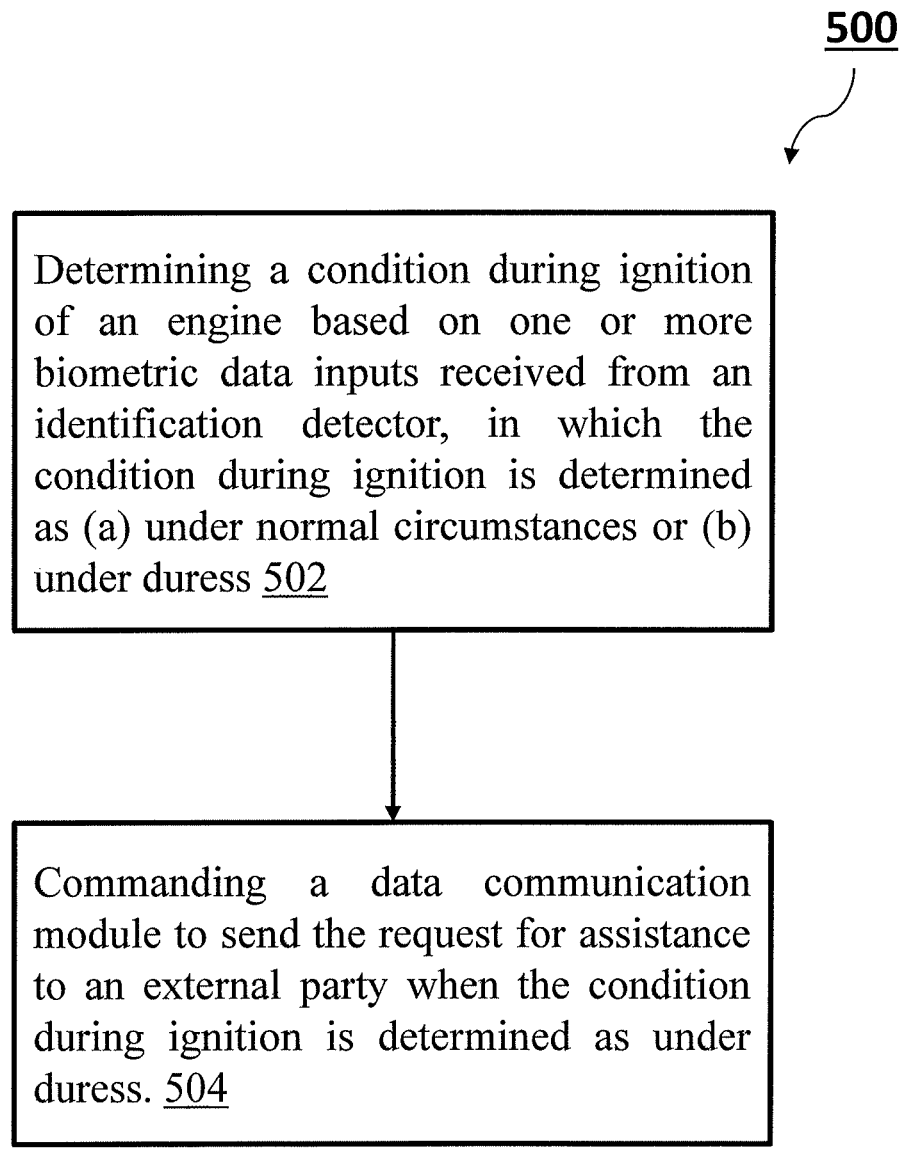
FIG. 5 shows a flowchart of sending a request for assistance when according to a preferred embodiment.

FIG. 5 shows a flowchart 500 of a method of sending a request for assistance from a vehicular safety and security system. The method includes a first step of determining a condition during ignition of an engine based on one or more biometric data inputs received from an identification detector, in which the condition during ignition is determined as (a) under normal circumstances or (b) under duress at step 502, and commanding a data communication module to send the request for assistance to an external party when the condition during ignition is determined as under duress at step 504.

The above detailed description is not intended to be exhaustive or to limit the disclosure to the precise embodiments disclosed herein. Modifications and equivalents will be apparent to practitioners skilled in the art and are encompassed within the spirit and scope of the appended claims.

The invention claimed is:

1. A vehicular system comprising:
a data communication module;
a first identification detector to receive one or more first biometric data inputs from a vehicle occupant;
a second identification detector to receive one or more second biometric data inputs from the vehicle occupant; and
a decision unit to determine a condition during ignition of an engine based on the one or more first biometric data inputs, the decision unit configured to:
determine that the condition during ignition indicates that the one or more first biometric data inputs were received from the vehicle occupant under normal circumstances when the one or more first biometric data inputs received is a match with a first set of pre-registered biometrics data,
determine that the condition during ignition indicates that the one or more first biometric data inputs were received from the vehicle occupant under duress when the one or more first biometric data inputs received is a match with a second set of pre-registered biometrics data,
in response to determining that the one or more first biometric data inputs were received from the vehicle occupant under duress, perform a verification to verify whether vehicle occupant is under duress, the verification includes determining that one or more second biometric data inputs indicate that the vehicle occupant is under duress, and
command the data communication module to send a notification to an external party in response to the verification verifying that the vehicle occupant is under duress.

2. The vehicular system of claim 1, wherein the condition during ignition is determined as under normal circumstances when the one or more first biometric data inputs received is a match with a first set of pre-registered biometrics data.

3. The vehicular system of claim 2, wherein the condition during ignition is determined as under duress when the one or more first biometric data inputs received is a match with a second set of pre-registered biometrics data.

4. The vehicular system of claim 3, wherein the condition during ignition is verified as under duress when in response to the match with the second set of pre-registered biometric data, a result of the secondary verification indicates the one or more second biometric data inputs received is a mismatch with a third set of pre-registered biometrics data.

5. The vehicular system according to claim 1, wherein the first one or more biometric data inputs and the second one or more biometric data inputs are a fingerprint or a facial recognition image.

6. The vehicular system according to claim 2, wherein the first set of pre-registered biometrics data is a fingerprint.

7. The vehicular system according claim 3, wherein the second set of pre-registered biometrics data is a fingerprint that is different from the first set of pre-registered biometrics data.

8. The vehicular system according to claim 4, wherein the third set of pre-registered biometrics data is a facial recognition image under normal circumstances.

9. The vehicular system according to claim 1, wherein when the condition during ignition is determined as under normal circumstances, ignition of the engine occurs.

10. The vehicular system according to claim 1, wherein when the condition during ignition is determined as under duress, ignition of the engine and the decision unit commanding the data communication module to send the notification to the external party occur simultaneously.

11. The vehicular system according to claim 1, wherein the notification comprises of a request for assistance and a location of the vehicular system determined by a sensor.

12. The vehicular system according to claim 11, wherein the notification further comprises an image captured by the second identification detector.

13. A motor vehicle having a vehicular system in accordance with claim 1.

14. A method of sending a request for assistance from a vehicular system, the method comprising:
receiving, by a first identification detector, one or more first biometric data inputs from a vehicle occupant,
receiving, by a second identification detector, one or more second biometric data inputs for the vehicle occupant,
determining, by a decision unit, a condition during ignition of an engine based on the one or more first biometric data inputs;
determining, by the decision unit, that the condition during ignition indicates that the one or more first biometric data inputs were received from the vehicle occupant under normal circumstances when the one or more first biometric data inputs received is a match with a first set of pre-registered biometrics data;
determining, by the decision unit, that the condition during ignition indicates that the one or more first biometric data inputs were received from the vehicle occupant under duress when the one or more first biometric data inputs received is a match with a second set of pre-registered biometrics data;
in response to determining that the one or more first biometric data inputs were received from the vehicle occupant under duress, perform a verification to verify whether vehicle occupant is under duress, the verification includes determining that one or more second biometric data inputs indicate that the vehicle occupant is under duress; and
commanding, by the decision unit, a data communication module to send the request for assistance to an external party in response to the verification verifying that the vehicle occupant is under duress.

15. The method of claim 13, wherein when the condition during ignition is determined to be under normal circumstances, the ignition of the engine occurs.

16. The method of claim 13, wherein when the condition during ignition is determined to be under duress, the ignition of the engine and the sending of request for assistance to the external party occur simultaneously.

17. The method according to claim 13, wherein the condition during ignition is determined by comparing the one or more first biometric data input against a set of pre-registered biometrics data stored in the vehicular system.

18. The method according to claim 13, wherein the condition during ignition is determined as under normal circumstances when the one or more first biometric data inputs received compared against a first set of pre-registered biometrics data is a match.

19. The method according to claim 13, wherein the condition during ignition is determined as under duress when the one or more first biometric data inputs received compared against a second set of pre-registered biometrics data is a match.

20. The method according to claim 18, wherein the condition during ignition is determined as under duress when the one or more first biometric data inputs received compared against a third set of pre-registered biometrics data is a mismatch.

21. The method according to claim 17, wherein the first set of pre-registered biometrics data is a fingerprint.

22. The method according to claim 18, wherein the one or more first biometric data inputs comprise a first set of pre-registered biometrics data and a second set of pre-registered biometrics data and wherein the second set of pre-registered biometrics data is a fingerprint that is different from the first set of pre-registered biometrics data.

23. The method according to claim 20, wherein the third set of pre-registered biometrics data is a facial recognition image under normal circumstances.

24. The method according to claim 13, wherein the request for assistance further includes a location of the vehicular system determined by a sensor.

* * * * *